United States Patent Office 2,964,513
Patented Dec. 13, 1960

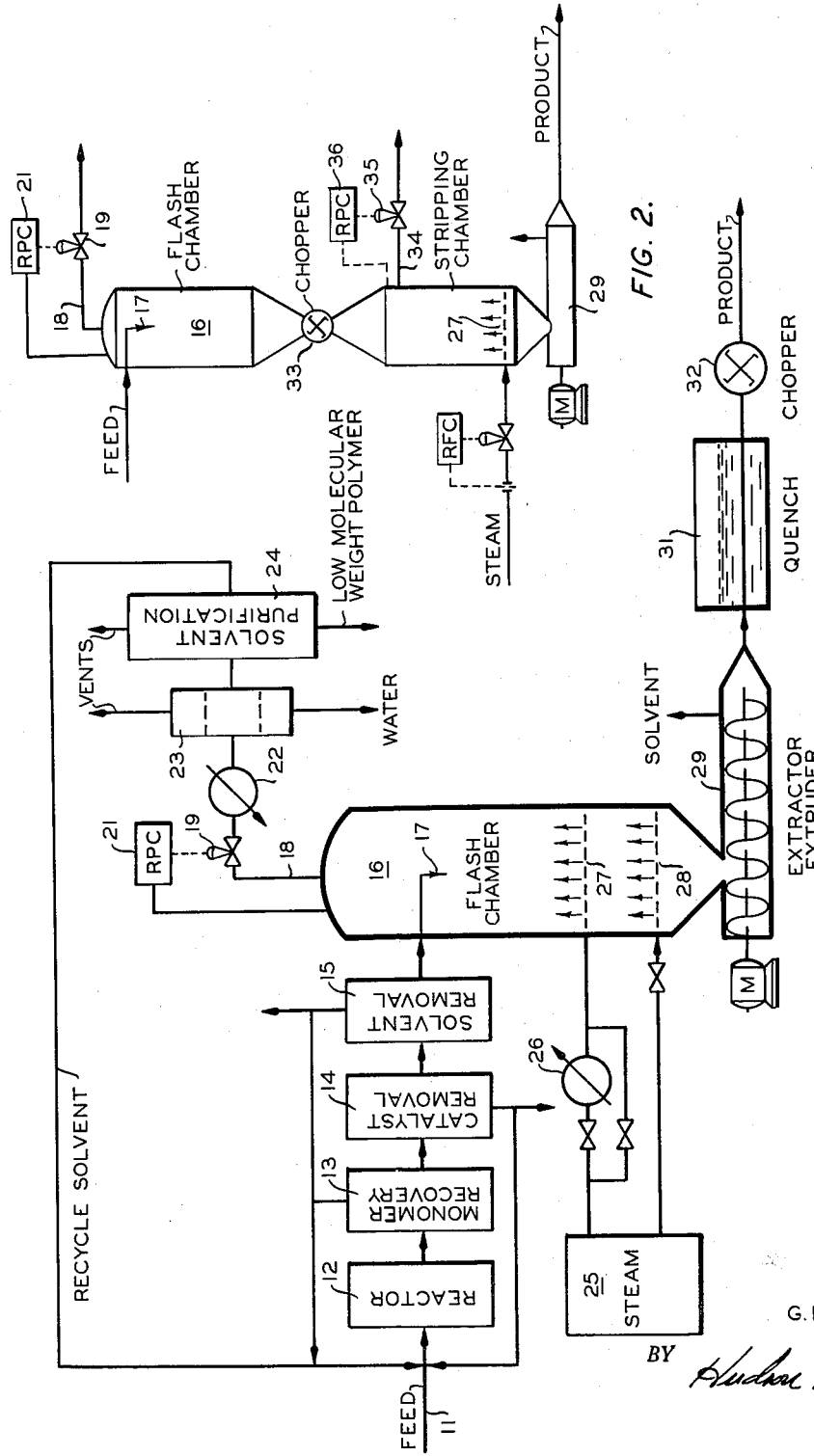

2,964,513

POLYMER RECOVERY PROCESS

Glenn H. Dale, Bartlesville, Okla., assignor to Phillips Petroleum Company, a corporation of Delaware Filed Aug. 20, 1956, Ser. No. 604,949

6 Claims. (Cl. 260—94.9)

This invention relates to a method of recovering a solid polymer from solution. In another aspect it relates to a method of preparing a polymeric product having a high bulk density. In one of its more specific aspects this invention relates to a process for separating a normally solid olefinic polymer from solution in a hydrocarbon solvent by flashing the solution in a heated gaseous atmosphere.

In many methods of preparing normally solid thermoplastic polymers, particularly in processes for the polymerization of olefins, solvents which are inert and liquid under contacting conditions are employed to facilitate the polymerization reaction and aid in subsequent purification steps, such as monomer recovery and catalyst removal. In such processes the solvent must be removed with any other vaporizable material in order to recover the solid polymer in a usable form. Residual amounts (often as low as 1 weight percent) of light components in the polymer will vaporize upon heating, as in injection molding, thus forming bubbles and cavities in the finished product. For many applications of such polymeric material the allowable limit of vaporizable components is less than about 1 weight percent, and often it is less than 0.1 weight percent.

The separation of solvent from the polymer presents several problems, particularly when the polymer concentration is initially low, for example, 10 weight percent or less. Vaporization processes are hampered because the viscous nature of the polymer solution reduces heat transfer and can cause considerable foaming as the polymer concentration increases. One method of producing a polymer with less than 1 weight percent residual solvent is by flashing the polymer solution under such conditions that a substantial portion of the solvent is vaporized and a solid polymer is precipitated; however, quite often this solid polymer is a highly expanded cellular material having a bulk density which may be as low as 1 pound per cubic foot. This light material is difficult to handle in subsequent operations and it cannot readily be fed to extrusion apparatus at a satisfactory rate because of its light fluffy nature. Remelting this material is extremely difficult because its insulating effect is such that decomposition temperatures may be reached in some regions before other parts of the material become softened.

I have discovered a new method of flashing such a polymer solution under controlled conditions so that a substantial portion of the solvent is evaporated but the product formed is a dense polymer which is easily conveyed and extruded. (All references made to density and densification in this specification refer to bulk density rather than to particle density.) Broadly, my invention comprises flashing the polymer solution in an atmosphere of inert gas which is held at a temperature sufficiently high to heat the polymer above its melting point. I have found that polymers of the type which my invention involves undergo considerable densification when exposed to temperatures above their melting points. Also, to produce a solid product the polymer should not be heated to the temperature at which it becomes fluid. While any gas which is inert, preferably non-oxidizing, at the flashing conditions is suitable for the practice of this invention, it is preferred that the heating be accomplished by direct contact with super-heated steam which serves to strip solvent and light waxes from the polymer. In case the polymer thus densified shows tackiness and a tendency to agglomerate, it can be subsequently passed through a suitable cooling medium, such as low temperature steam and "case hardened" before passing to other processing steps.

It is an object of this invention to provide a method of producing a dense, solid thermoplastic polymer.

It is another object of this invention to provide a method for separating a normally solid thermoplastic polymer from solution in a form that is easy to handle, mold or extrude.

It is another object of this invention to provide a method for separating volatile material from a polymeric product in such a manner that solvent and light waxes are removed and a dense, solid product is formed.

Other objects, features and advantages of this invention will become apparent to those skilled in the art from the accompanying description and drawings in which:

Figure 1 is a schematic flow diagram showing a polymerization process with one embodiment of my invention, and Figure 2 shows another embodiment of my invention adapted to produce discrete polymer particles.

The process of this invention can be usefully applied for the recovery from solution of any normally solid thermoplastic polymer which has a definite melting point as defined herein, preferably below its softening temperature, such as polystyrene, polybutadiene and the like. It is, however, of particular advantage in polymer recovery processes for the polymerization or copolymerization of polymerizable olefins, especially aliphatic and cyclic olefins including both mono- and diolefins, for example ethylene, butadiene and the like. Among the examples of the preferred class of products of these polymerization reactions are homopolymers of ethylene, propylene, 1-butene, 1-pentene, and the like, and copolymers of ethylene, propylene, 1-butene, 2-butene or butadiene and the like. In a preferred embodiment of this invention, recovery is effected for a polymer of aliphatic 1-olefins with a maximum of 8 carbon atoms per molecule and no branching nearer the double bond than the 4-position which have been polymerized in the presence of a catalyst comprising chromium, a portion of which is hexavalent (preferably at least 0.1 percent by weight of the total catalyst), as chromium oxide associated with at least one oxide from the group consisting of silica, alumina, thoria, and zirconia. The total chromium content of the catalyst is preferably between 0.1 and 10 weight percent. Such a polymerization is ordinarily carried out at a temperature between 150 and 450° F., and the pressure of the reaction can vary over a wide range, for example from atmospheric to 1000 pounds per square inch absolute and above. The olefin is polymerized in a solvent which is liquid and inert under contacting conditions, preferably a hydrocarbon solvent such as naphthenic hydrocarbons and paraffinic hydrocarbons of from 3 to 12 carbon atoms, for example isooctane and cyclohexane.

In the polymerization reaction for the preferred embodiment of this invention the reactor effluent comprises a solution of polymer and unreacted monomer in solvent; and when slurry or suspended catalyst is used, the solution also contains catalyst. The monomer is removed from the reactor effluent by flashing and the catalyst, if present, can be removed by any suitable solids separation method such as filtration or centrifugation. In some instances the catalyst is allowed to remain in final product. It is frequently necessary to add more solvent during these purification steps in order that polymer is not prematurely precipitated in the purification equipment. In the polymerization of ethylene by the above described process the polymer concentration in solution following the catalyst removal step is normally in the range of 2 to 10 weight percent. Evaporation steps can be used to concentrate the solution to the upper part of this range, for example 8 to 10 weight percent; or the solution can be flashed directly to remove the solvent and form the solid polymer. According to my invention a solid polymer product is formed by dispersing this relatively dilute polymer solution in a flashing zone wherein contact is made with a hot inert gas so that the polymer is heated above its melting point but below the temperature at which the polymer would become fluid. For example, the melting point of polyethylene prepared by a process such as herein described is generally in the range of 250 to 255° F., usually about 252 to 253° F. The softening temperature of this polymer is about 260° F. and it does not approach the fluid state until its temperature reaches about 270° F. and above. The term "melting point" as used in this specification refers to that temperature, or temperature range, at which the cooling curve of the polymer exhibits a plateau or inflection point, sometimes called crystalline freezing point. This plateau is quite pronounced for highly crystalline polymers and becomes less discernible for polymers having overall lesser crystallinity. It appears that the temperature at which the polymer undergoes densification from an expanded or cellular form approximates its melting point as herein defined. The polymer remains solid above this melting point and below the softening temperature, but above the softening temperature begins to develop tackiness which increases until a fluid state is reached. The softening temperature as used in this specification refers to the ability of a particular polymer to support a standard load or withstand a force at elevated temperatures without substantial deformation. "Softness" of a polymer is a measure of its relative deformation under a standard load for a certain time interval at a particular temperature. The method for determing softness as used in this specification is that described in the article by Karrer, Davis and Dieterich in Industrial and Engineering Chemistry (Analytical Edition) 2, 96 (1930). The softening temperature for a polymer is determined by plotting softness over a range of temperatures with temperature on the abscissa. As softness increases with temperature, the slope of the curve formed by the plot likewise increases, and the temperature at which the slope of the curve equals tan of 60° is, by definition, the softening temperature. The relative values of softening temperature and melting point will vary considerably for different polymers. In some cases the softening temperature is substantially higher, for example 10 or 15° F., than the melting point, and in other instances the difference is much less, some polymers even having softening temperatures, as defined, below their melting points. A fluid condition is ordinarily not reached, however, until a few degrees above the softening temperature.

The gases which can be used to practice this invention must be inert, especially non-oxidizing under conditions of temperature and pressure at which the contacting within the flash zone takes place. Suitable gases are nitrogen, carbon dioxide, stack gases and vapors of light hydrocarbons. Preferred over these is super-heated steam; and although saturated steam can be used, this results in moisture condensing on the polymer which must later be removed. Even super-heated steam may tend to accumulate as moisture in the voids of the expanded polymer but this amount is small and can be removed, if desired, by stripping with an inert gas. Super-heated steam, besides being cheap, effects steam distillation of the solvent and light waxes in the polymer and thus enables the recovery of an improved product. The pressure within the flashing zone can be maintained at subatmospheric, atmospheric, or superatmospheric, but pressures within the range of 0 to 15 pounds per square inch gauge are preferred. The temperature of the steam and its rate of introduction will depend upon the desired temperature within the flash chamber for the particular polymer being processed. The temperature of the incoming steam must be below the decomposition temperature of the polymer. For example, in the recovery of polyethylene produced as described above, a flash temperature of at least 250° F. and preferably in the range of 260 to 270° F. is desired. Super-heated steam below about 500° F. is admitted to the flash zone at a rate sufficient to maintain this temperature within the flash chamber without condensing the steam.

For a better understanding of my invention reference is now made to Figure 1 of the accompanying drawings which depicts schematically a typical polymerization and polymer recovery process for a 1-olefin, for example polyethylene, as described above. As shown in Figure 1, feed materials of monomer, solvent, and catalyst are introduced through line 11 to reactor 12 wherein conditions of temperature and pressure are maintained in order to effect polymerization of the monomer. The reactor effluent, which comprises monomer and polymer dissolved in solvent and catalyst in suspension, is passed to monomer recovery zone 13 wherein the unreacted monomer is flashed and recycled to the polymerization zone. The polymer solution then passes to catalyst removal step 14, which can include filters, centrifuges, or any suitable equipment which will remove the catalyst from suspension in the solution. The catalyst thus removed can be discarded or reactivated and reused in the polymerization process. In solvent removal zone 15, through which the solution passes next, solvent is evaporated, condensed, and recycled to the polymerization zone or passed to suitable purification means. In this step the solution is concentrated by evaporation until the viscosity of the solution, which increases rapidly as the polymer concentration increases, makes further evaporation for solvent recovery impracticable. For example, in the polymerization of ethylene as described, the viscosity of the solution of polyethylene in a hydrocarbon solvent such as cyclohexane makes further evaporation impracticable when the polymer concentration reaches about 8 to 10 weight percent.

The polymer solution thus concentrated is fed to flash chamber 16 through nozzle 17 which disperses the solution into droplets. The dispersed solution is immediately contacted with steam thus stripping solvent and light waxes from the solution and causing polymer to precipitate as a solid. Vapors leave the flash chamber through conduit 18 and valve 19 as controlled by pressure controller recorder 21 which maintains the desired pressure within the flash zone. The vapors are condensed in condenser 22 forming solvent and water phases which are separated in zone 23. The solvent is further purified in zone 24 wherein the light waxes or low molecular weight polymers are removed prior to recycling the solvent to the polymerization zone. Steam from header 25 passes through super-heater 26 and is introduced by distributor 27 into the flash chamber. This super-heated steam effects the steam distillation of the solvent and passes from the flash zone with the vapors. Precipitated polymer in contact with the steam is heated to a temperature above its melting point and densifies as it continues to fall to the bottom of the flash chamber. As the polymer particles fall into the lower section of the chamber they are contacted with low temperature steam introduced through distributor 28 and cooled to a temperature below their softening point. The polymer particles thus cooled have essentially no tendency to agglomerate. The densified polymer is then processed in extruder 29 wherein substantially all of the residual solvent is removed and the polymer is extruded in a form suitable for chopping and storage. The extruded polymer strands are passed through quench zone 31 and chopped into small pellets by pelletizer 32. In the application of this process to the recovery of polyethylene from solution, a solid polymer having a bulk density in the range of about 20 to 30 pounds per cubic foot is produced. Recovering this polymer by vacuum flashing without the practice of my invention has produced a product with a bulk density of about 1 pound per cubic foot.

Because of the viscous nature of the solution as it is introduced to the flash zone, it is often quite difficult to disperse the solution in the form of droplets. Instead the solution is sprayed in several streams and upon evaporation of solvent the precipitated polymer takes the form of strings or fibers rather than small particles. A modification of my invention for this possibility is shown in Figure 2. In this embodiment the solution is flashed in the upper chamber of zone 16 and strings of precipitated polymer fall through chopping device 33 which reduces the polymer to small particles. The chopped material then falls into a steam stripping chamber which is the lower portion of zone 16 and which operates at approximately the same pressure as the flash chamber. Solvent is further removed from the polymer particles by the stripping action of the steam and leaves as vapor through line 34 and valve 35 which is controlled by pressure controller 36. Likewise, the polymer particles are densified by contact with the steam which heats them above the polymer melting temperature and passed to further processing as described in connection with the embodiment of Figure 1. The chopping mechanism can be of any suitable type, for example a device having stationary and rotary blades, a large opening at the top through which fibers of polymer may enter and a bottom screen or plate having a plurality of holes through which the particles may fall into the steam stripping chamber.

The time required to densify the polymer is usually quite short, for example, about 1 second to 3 minutes; but under some conditions either a longer or shorter contact period can be used. In introducing the polymer solution to the flash chamber, it is desirable to disperse the solution as much as possible; however, for some solutions it is difficult to form droplets with a spray nozzle, especially if the polymer is a very high molecular weight material, in which case the embodiment of Figure 2 would be appropriate. In certain instances the addition of steam to the solution prior to spraying enables the formation of fine droplets, and in processes where it is possible to obtain a good dispersion of solution resulting in the formation of individual particles of polymer, the embodiment of Figure 1 is preferred.

As a further clarification of my invention the following example is discussed in connection therewith. It should be understood, however, that the example as well as the specific embodiments of the drawings and above discussion is meant to be exemplary only and not to limit unduly my invention.

Ethylene is polymerized in a cyclohexane solvent at about 300° F. and 500 pounds per square inch absolute in the presence of a granular chromium oxide-silica-alumina catalyst. Unreacted ethylene and catalyst are removed from the effluent reactor stream resulting in a polymer solution of about 5 weight percent polyethylene in cyclohexane. This solution is heated to about 400° F. and dispersed in a flash chamber operated at 5 pounds per square inch gauge. Super-heated steam at 433° F. is introduced into the flash chamber and contacted with the dispersed polymer solution at a rate such that there is substantially no condensation. Cyclohexane and water vapors at about 265° F. leave the flash chamber and are condensed prior to passing to further separation steps. Polyethylene is precipitated in small particles and densified by contact with the vapors in the range of 260 to 270° F. As the densified particles fall to the bottom of the chamber they are contacted with steam at 240° F. which cools the particles and surface hardens them so that they do not agglomerate. The resultant product is a granular polyethylene having a bulk density of about 20–30 pounds per cubic foot. A material balance for this process is shown in table.

TABLE I

*Material balance for flash recovery of polyethylene from solution in cyclohexane*

(Pounds per hour)

[Operating pressure—5 p.s.i.g.]

| | Polyethylene | Cyclohexane | Steam | Temp., °F. |
|---|---|---|---|---|
| Feed Solution | 12 | 228 | | 400 |
| Feed Steam | | | 146 | 433 |
| Overhead Vapors | 0.2 | 228 | 146 | 265 |
| Product | 11.8 | | | |

It can be seen from the above example and discussion that several problems which have heretofore hindered the flash recovery method for polymer-solvent separation can be solved by the practice of my invention. Not only are conveying and remelt problems obviated, but the resultant product is improved through the steam stripping action of the process.

I claim:

1. A method of forming dense, solid, particulate polymer of aliphatic monoolefins having a maximum of 4 carbon atoms per molecule from a viscous solution of about 2 to 10 weight percent of said polymer in a hydrocarbon solvent selected from the group consisting of naphthenic hydrocarbons and paraffinic hydrocarbons of from 3 to 12 carbon atoms per molecule which comprises passing said solution to a vertically elongated flash zone, dispersing said solution into droplet form, vaporizing said solvent thus precipitating solid polymer particles, allowing said particles to fall through a first atmosphere of steam maintained at a temperature sufficient to heat said polymer above its crystalline freezing point without substantial softening thus forming dense polymer particles, allowing said dense particles to fall through a second atmosphere of steam maintained at a temperature below the crystalline freezing point of said polymer thereby cooling said polymer and reducing the cohesiveness of said particles, collecting the thus cooled dense polymer particles, and conveying said particles to a subsequent operation.

2. A method according to claim 1 wherein said polymer is polyethylene and said solvent is cyclohexane.

3. A method for forming dense, solid, particulate polymer of aliphatic monoolefins having a maximum of 4 carbon atoms per molecule from a solution of about 8 to 10 weight percent of said polymer in a hydrocarbon solvent selected from the group consisting of naphthenic hydrocarbons and paraffinic hydrocarbons of from 3 to 12 carbon atoms per molecule which comprises passing said solution to a vertically elongated flash zone, mixing steam with said solution immediately prior to entry thereof into said flash zone, dispersing said solution in said flash zone thereby forming droplets of polymer solution, vaporizing said solvent from said droplets thereby precipitating particles of solid polymer, allowing said polymer particles to fall through a first atmosphere of steam maintained at a temperature sufficient to heat said polymer above its crystalline freezing point without substantial softening thereby densifying said polymer, allowing said particles to continue falling through a second atmosphere of steam maintained at a temperature below the crystalline freezing point of said polymer thereby reducing the cohesiveness of said particles, collecting the thus formed dense solid polymer particles, and conveying said particles to a subsequent operation.

4. A process for forming discrete particles of dense, solid polymer from a solution of a polymer of 1 olefin having 2 to 8 carbon atoms and no branching nearer the double bond than the four-position dissolved in a hydrocarbon solvent which comprises dispersing said solution in the upper portion of a vertically elongated flashing zone thus vaporizing solvent and precipitating solid polymer, passing into said zone below the point of solution introduction a heated first gas, contacting said precipitated polymer with said heated first gas, the temperature and quantity of said first gas being such as to heat said polymer above its crystalline freezing point without substantial softening, passing a second gas cooler than the first into said zone below the point of introducing said first gas, contacting the thus heated polymer with said second gas the temperature and quantity of which is sufficient to cool said polymer below its crystalline freezing point, and withdrawing said particles of polymer from the lower portion of said zone.

5. The process of claim 4 wherein the precipitated polymer is chopped into particles before contact with said first gas.

6. The process of claim 4 wherein said first and second gases are steam and said polymer is polyethylene which is heated by said first gas to a temperature in the range of 250 to 270° F. and cooled by said second gas to below 250° F.

References Cited in the file of this patent

UNITED STATES PATENTS

| | | |
|---|---|---|
| 2,187,877 | Ferris et al. | Jan. 23, 1940 |
| 2,565,960 | Garber et al. | Aug. 28, 1951 |
| 2,658,059 | Peters et al. | Nov. 3, 1953 |
| 2,726,234 | Field et al. | Dec. 6, 1955 |
| 2,827,444 | Cines | Mar. 18, 1958 |

FOREIGN PATENTS

| | | |
|---|---|---|
| 609,560 | Great Britain | Dec. 28, 1948 |

OTHER REFERENCES

"Chemical and Metallurgical Engineering," Brothman et al. pages 108–112, March, 1943.